Sept. 10, 1968 L. J. LOGAN 3,401,250

WELDING APPARATUS

Filed July 28, 1965 5 Sheets-Sheet 1

INVENTOR.
LEWIS J. LOGAN
BY
Woodling Kent Granger + Rust
Attys.

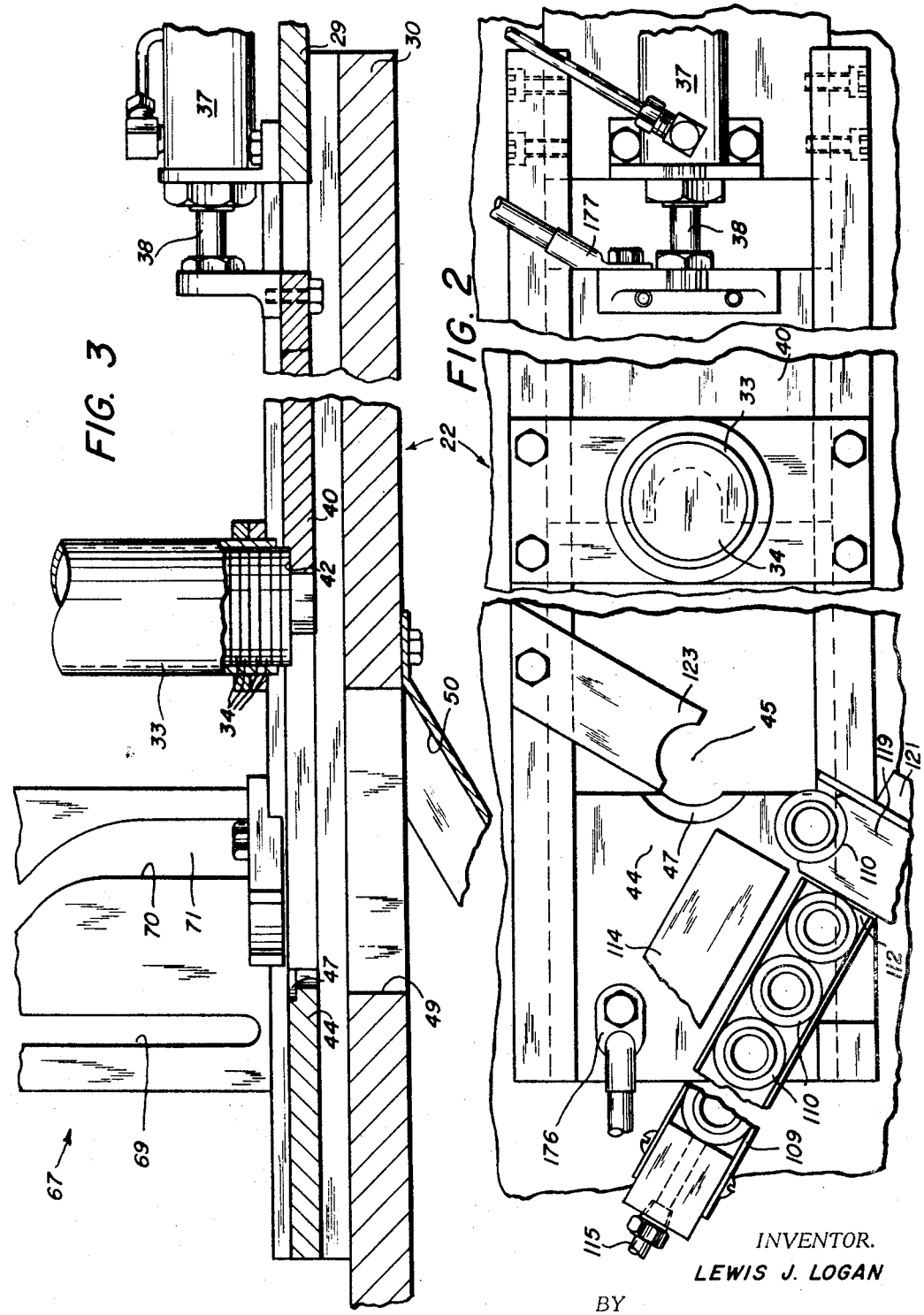

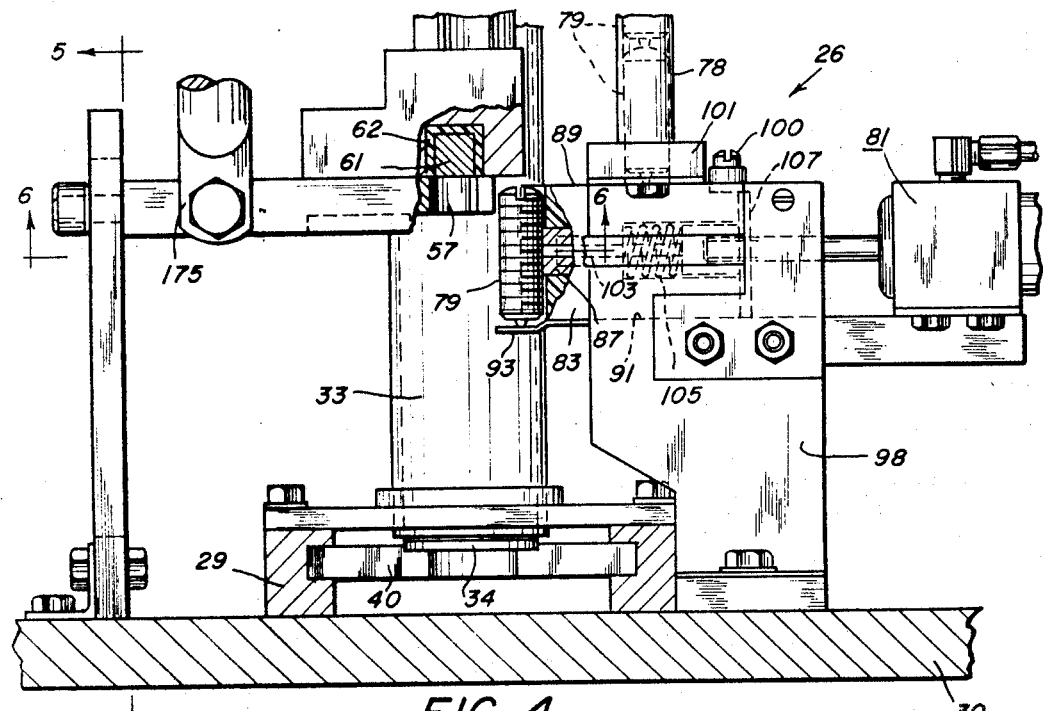
FIG. 4
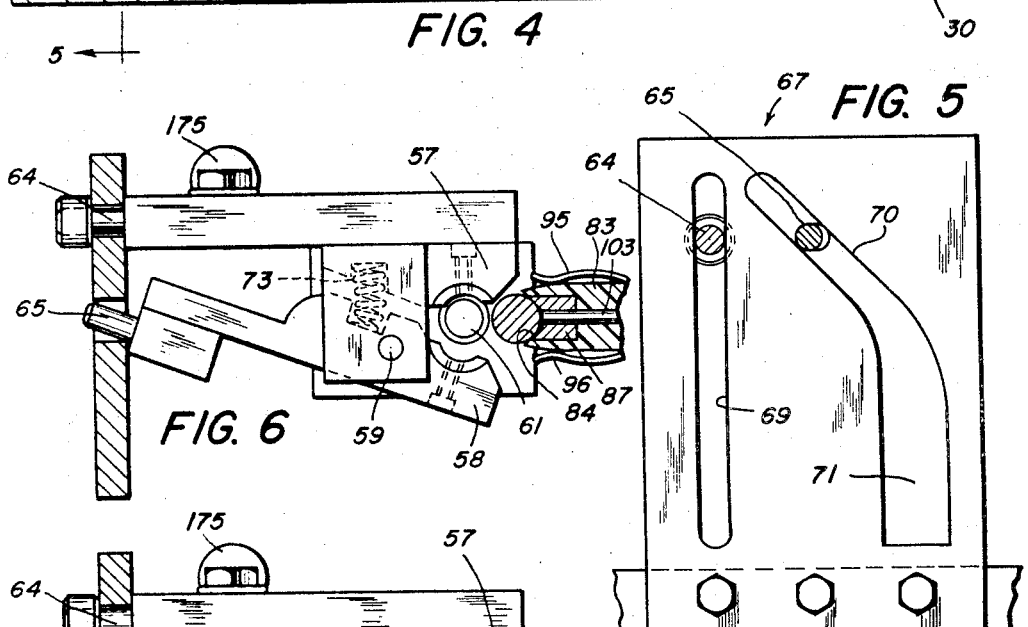
FIG. 5
FIG. 6
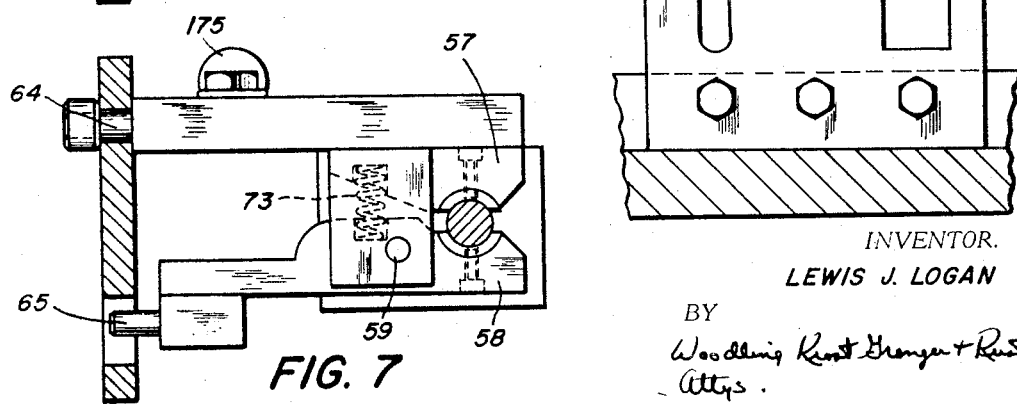
FIG. 7
INVENTOR.
LEWIS J. LOGAN Sept. 10, 1968     L. J. LOGAN     3,401,250
WELDING APPARATUS
Filed July 28, 1965     5 Sheets-Sheet 4
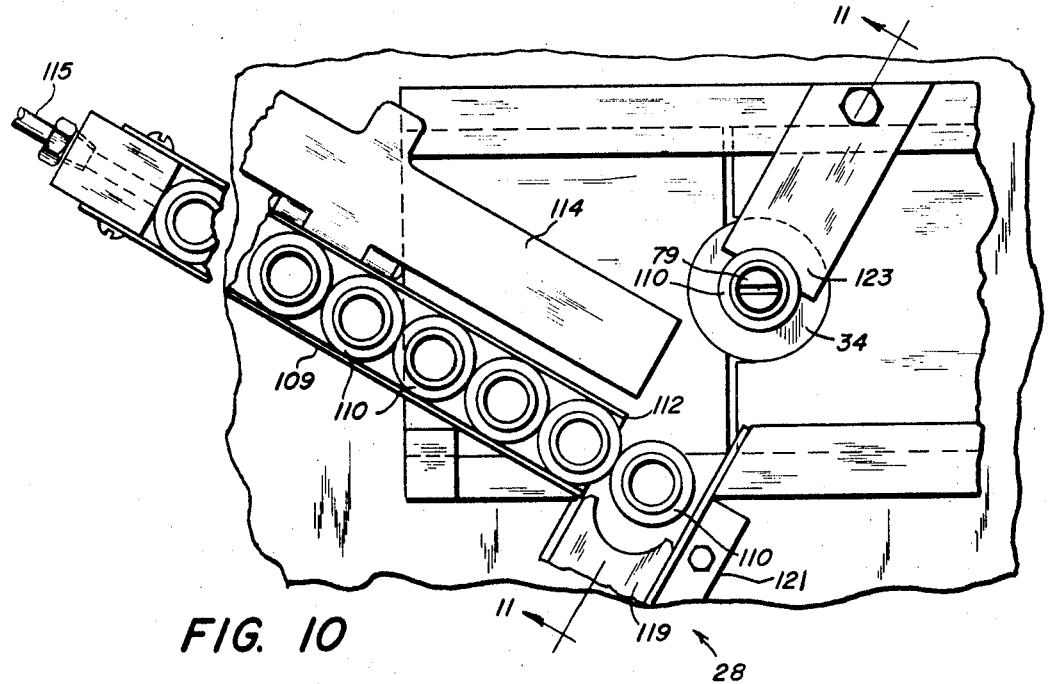
FIG. 10
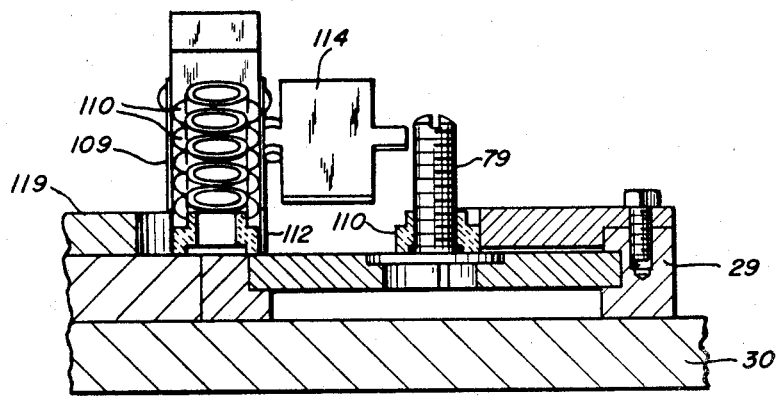
FIG. 11
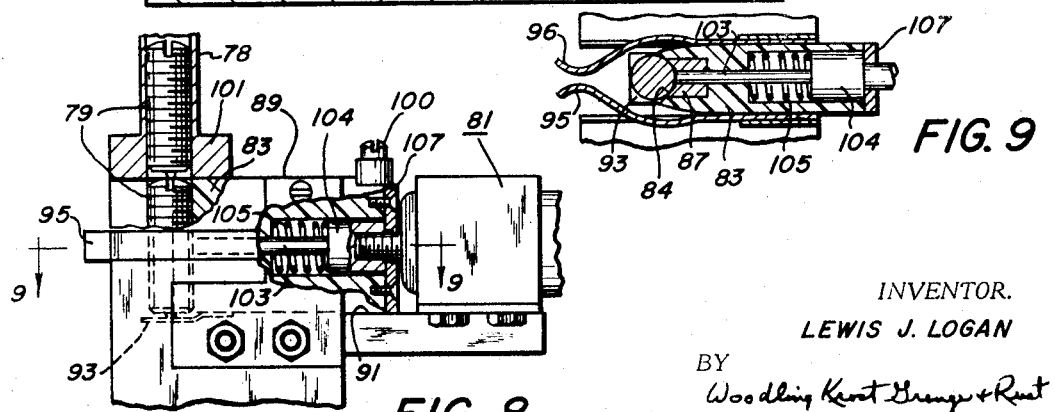
FIG. 9
FIG. 8
INVENTOR.
LEWIS J. LOGAN
BY
Woodling Kvost Granger + Rust
Attys.

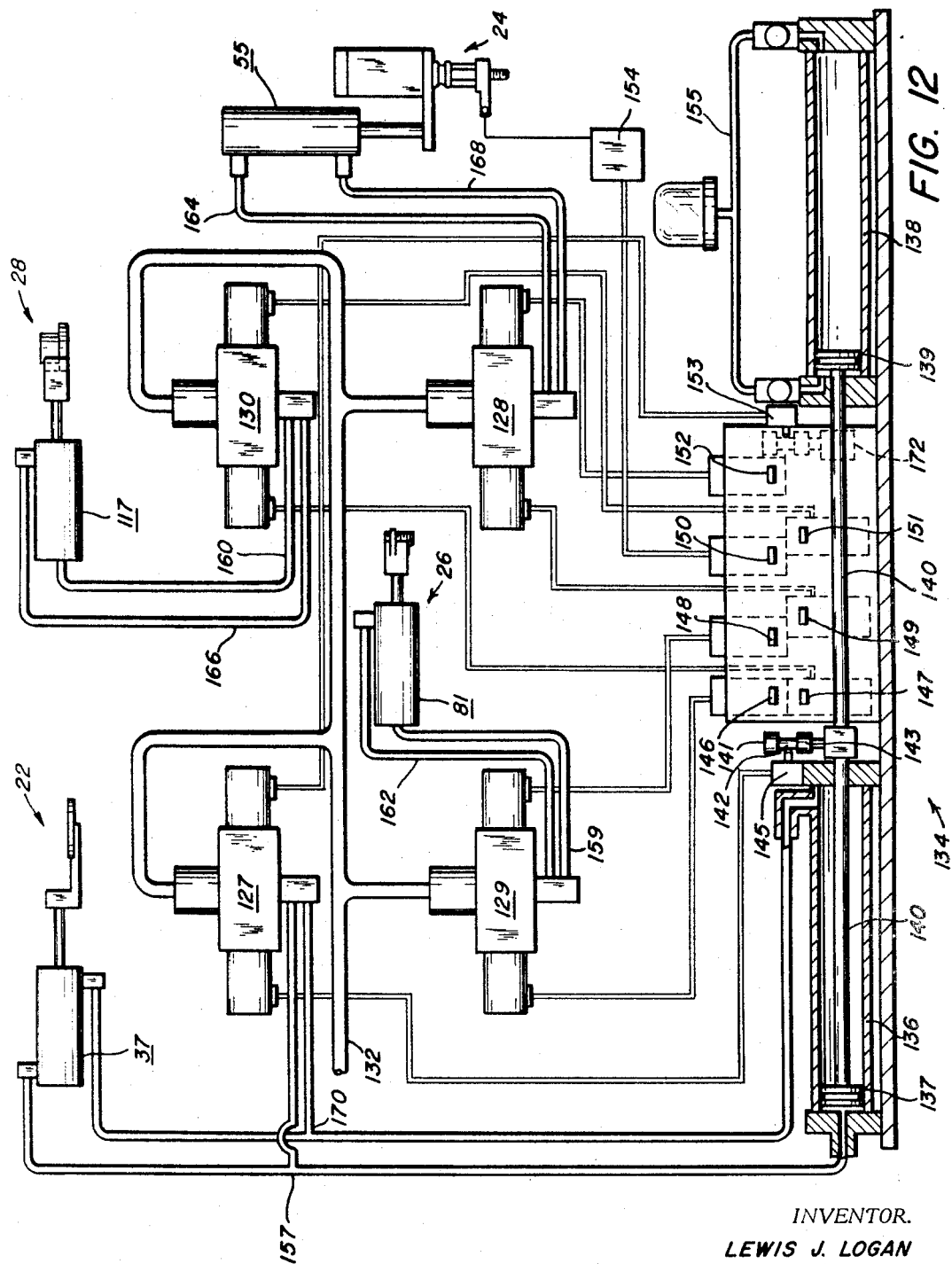

United States Patent Office 3,401,250
Patented Sept. 10, 1968

3,401,250
WELDING APPARATUS
Lewis J. Logan, 11820 Edgewater Drive,
Lakewood, Ohio 44107
Filed July 28, 1965, Ser. No. 475,474
9 Claims. (Cl. 219—98)

ABSTRACT OF THE DISCLOSURE

Welding apparatus which includes a magazine for plates and a means to move the same to a welding station as well as a magazine for ferrules and means to move the ferrules to the station. Welding head means are positioned above the station and include clamping jaws and a magnet and means are provided for moving the same between a loading station and the welding stations. A stud magazine is provided and another means takes a stud from the magazine and carries the same to a position close to the magnet at the loading station and the magnet holds the stud. The jaws are open at the loading station and closed at the welding station and means are provided to perform the welding operation.

---

The present invention relates in general to welding apparatus and more particularly to such apparatus which is susceptible of automatically feeding to a welding position in the desired sequence a weld stud, a ferrule, and an object to which the stud is to be welded and thereafter welding the same, on a very high production basis.

An object of the present invention is to automatically weld studs to a metal member in an automated manner thereby producing welds of a very consistent nature and to a very large degree taking the human element out of the welding procedure.

Another object of the present invention is to provide a novel means of transferring weld studs from a stud magazine to the chuck of a welding head which it utilized in the welding operation.

Another object of the present invention is to provide a new and novel chuck for use with a welding head or weld gun.

Another object of the present invention is to provide an apparatus for automatically performing a stud welding operation which may be conveniently adapted to change the size of the studs and ferrules utilized as well as accomplishing the handling of various shaped objects to which the studs are to be welded and still utilize the apparatus on an automatic basis.

Another object of the present invention is to provide a novel mechanism for feeding ferrules from a ferrule magazine to a welding station.

Other objects and a fuller understanding of this invention may be had by referring to the following description and claims, taken in conjunction with the accompanying drawings, in which:

FIGURE 2 is a plan view of the plate feeder means of the welding apparatus;

FIGURE 3 is an elevational view of the structure shown in FIGURE 2;

FIGURE 4 is an elevational view of the stud feeder means of the welding apparatus shown in FIGURE 1;

FIGURE 5 is a view taken generally along the line 5—5 of FIGURE 4;

FIGURE 6 is a view taken generally along the line 6—6 of FIGURE 4;

FIGURE 7 is a view similar to FIGURE 6 but showing the chuck jaws in closed position;

FIGURE 8 is a view of a portion of the structure shown in FIGURE 4 with the structure being in a different position;

FIGURE 9 is a view taken generally along the line 9—9 of FIGURE 8;

FIGURE 10 is a plan view of a portion of the ferrule feeder means of the welding apparatus shown in FIGURE 1;

FIGURE 11 is a view taken generally along the line 11—11 of FIGURE 10; and

FIGURE 12 is a schematic view of the control means utilized in operating the welding apparatus shown in FIGURE 1.

Figure 1:
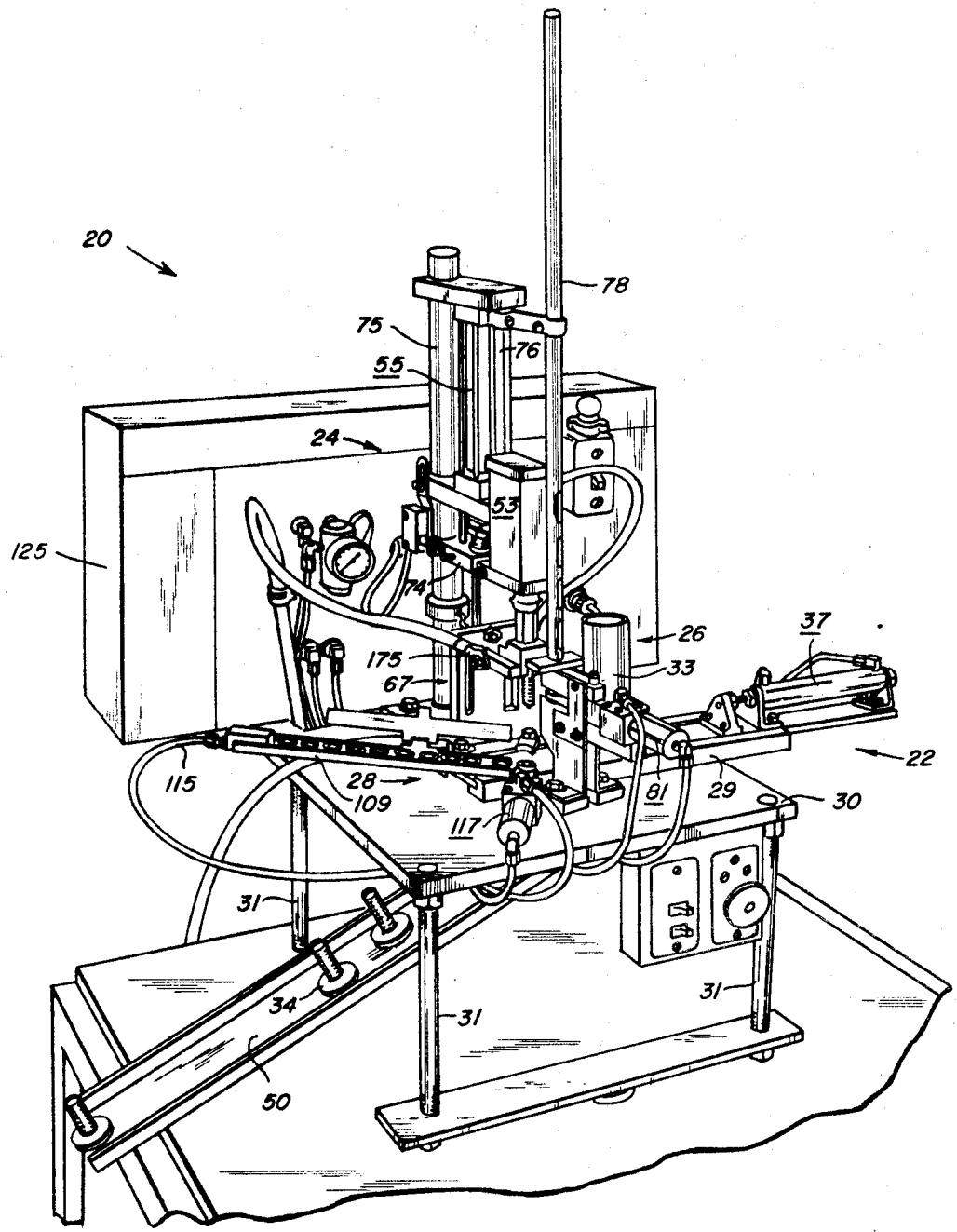
FIGURE 1 is a perspective view of the welding apparatus of the present invention.

The welding apparatus is best seen in FIGURE 1 of the drawings and is indicated generally by the reference numeral 20. The welding apparatus 20 is made up of several components which are identified generally in the following manner. A plate feeder means 22 is provided for the purpose of feeding plates or other desired objects to which studs are ultimately to be welded from a magazine to a welding station. Welding head means 24 are provided which includes several components including a means for moving the same between upper and lower vertical positions and stud feeder means 26 are provided for feeding studs to the welding head means. Also provided is ferrule feeder means 28 for the purpose of feeding ferrules to a welding station to accomplish a purpose in the welding operation which is well known to those skilled in the art.

The welding apparatus in addition to including the aforementioned elements includes a support member 29 carried by a table 30 which has legs 31. A plate magazine 33 which takes the form of a cylindrical tube is mounted at its lower end on the support member 29 and the plate magazine is adapted to carry a plurality of plates all of which have been indicated by the reference numeral 34. The plate feeder means referred to above comprises a first air piston and cylinder mechanism 37 connected by means of a rod 38 to a movable feeder plate 40. Wall means 42 are provided on the feeder plate 40 for receiving a plate 34 from the magazine 33. The wall means 42 takes the form, when viewed in FIGURE 2, of slightly more than half a circle to accommodate a plate 34 so that the plate will not tip off the end of the feeder plate 40 as it is transported thereby. A fixed clamping member 44 is positioned adjacent what has been described as a welding station 45 and the clamping member also has wall means 47 to accommodate the circular portion of a plate which is moved by the feeder plate 40 into engagement therewith. As will be described hereinafter, when the air piston and cylinder mechanism 37 is actuated, the feeder plate 40 moves from its retracted position in which it is shown in FIGURES 2 and 3 toward the clamping member 44 thereby picking up the lowermost plate 34 contained in the magazine 33 and carrying it to a position wherein the left side of the plate, as viewed in FIGURES 2 and 3, is brought into engagement with the wall means 47 where it is securely held by the action of the air piston and cylinder mechanism 37 until the welding operation has been accomplished. When the feeder plate 40 is retracted to the position shown in FIGURES 2 and 3, after the welding operation, the plate 34 with a weld stud welded thereto is caused to fall by the action of gravity through an opening 49 in the table 30 and down a chute 50 to a container or other similar means.

The welding head means 24 includes a welding head 53 positioned vertically above the welding station 45 and comprises a second air piston and cylinder mechanism 55 which is adapted to move the welding head 53 between an upper loading position in which it is shown in FIGURES 1 and 4 to a lower welding position which has not been shown in the accompanying drawings. The lower welding position is a position wherein a weld stud carried by the chuck of the welding head is brought into contact with a plate 34 to which it is to be welded at the welding station 45 with the mechanism of the welding head depressed what is commonly referred to in the art as the "plunge distance." When the welding cycle is initiated as will be briefly described hereinafter, conventional stud welding circuitry is energized wherein the tip of the weld stud is lifted a given distance above the surface of the plate and a potential difference is impressed across this gap causing welding current to flow across the gap creating an arc and melting a portion of the tip of the stud and a portion of the plate and after a predetermined cycle of time has elapsed, the weld current is shut off and the weld stud is moved back into contact with the plate causing the two objects to be welded together by the cooling of the metal melted by the weld current. This particular welding operation is well understood by those skilled in the art and further elaboration with respect thereto will not be given.

A stud chuck is carried by the welding head and includes a fixed jaw 57 and a movable jaw 58 pivotally mounted as at 59. Positioned vertically above the jaws 58 and 59 is a first permanent magnet 61 electrically insulated from the metal member which carries it by means of an insulating cover 62. It will be noted that the jaws 57 and 58 are each provided with what will be described as cam follower ends 64 and 65 respectively. Cam means 67 are provided for cooperating with the ends 64 and 65 and in this respect include a cam surface 69 which extends in a substantially vertical direction and a cam surface 70 which describes a path as shown in FIGURE 5 and which at its lower portion 71 is of a width which permits limited movement of the end 65 and consequently the jaw 58. It will also be noted in FIGURES 6 and 7 that a spring 73 is provided which exerts a constant biasing force tending to close the jaws 58 and 59. It will therefore be appreciated that the action of the cam surfaces 69 and 70 forces the jaws and specifically the movable jaw 58 to open in the upper position of the welding head 53 whereas in the lower position of the welding head the action of the spring 73 is permitted to be effective in holding the jaws 57 and 58 in what will be referred to as a closed condition. It will be noted in FIGURE 1 that the air piston and cylinder mechanism 55 is connected to a cross member 74 which in turn is guided in its vertical movement by guide 75.

The stud feeder means or mechanism 26 includes a generally vertically disposed stud magazine 78 generally supported by the table 30 and specifically at its upper portion is connected to a support 76. As will be noted in FIGURE 4, the stud magazine 78 is adapted to receive a plurality of weld studs 79 in end to end relation with each other and as one stud is used, the stud immediately above drops into its position by the action of gravity. The stud feeder means also includes a third air piston and cylinder mechanism 81 for moving the same between a stud receiving position in which it is shown in FIGURE 8 and a stud ejecting position in which it is shown in FIGURES 4 and 6. Included in the stud feeder means is a stud carrying block 83 having a front face 84 generally contoured or rounded in this specific instance to receive the curved side of a stud 79. A second permanent magnet 87 is positioned in an opening in the carrying block with one surface of the magnet being closely adjacent the front face of the carrying block. The carrying block 83 is provided with a top edge surface 89 which closes the end of the stud magazine in all positions of the carrying block except when the same is located at the stud receiving station (FIGURE 8) whereat a stud drops by gravity along the front face of the carrying block and it is attracted by the second permanent magnet 87 into intimate contact with the front face of the carrying block. The carrying block is also provided with a bottom edge surface 91 and secured to this surface is a ledge member 93 which extends beyond the front face and provides a vertical stop for studs carried by the front face and assures that if for some reason or another the second magnet 87 does not attrack the same, the stud will not accidently fall from the mechanism. First and second leaf spring-like members 95 and 96 are mounted by a support 98 on opposite sides of the carrying block and occupy the position shown in FIGURE 9 at the stud receiving station and prevent the stud which drops into position from falling too far forward should the magnet 87 not attract the stud. As the carrying block moves toward the stud ejection position, the stud is caused to engage the members 95 and 96 which causes the stud to be pulled into intimate contact with the front face of the carrying block in the event it is not already located there, and the members 95 and 96 pass over the sides of the carrying block in a manner shown in FIGURE 6. The carrying block carries a stop 100 on the upper surface thereof which is adapted to come into engagement with an abutment 101 carried by the support 98. This determines the position of the carrying block when the same arrives at the stud ejection position.

An ejecting pin 103 extends through an opening in the carrying block and terminates at its left end at the face 84 of the carrying block. The other end of the ejecting pin is formed into what may be referred to as a piston 104 and this piston threadably receives the piston rod which extends from the third air piston and cylinder mechanism 81. The cylindrical opening in the carrying block which receives the piston 104 also houses a spring 105 at the left end of the piston 104 as seen in FIGURES 4, 8 and 9 and this spring transmits the force received from the piston and cylinder mechanism 81 and moves the carrying block from the stud receiving position to the stud ejecting position. When the stop 100 engages the abutment 101 thereby limiting further movement of the carrying member, the piston and cylinder arrangement 81 still continues transmitting a force which overcomes the spring 105 causing the left end of the ejecting pin 103 to protrude from the opening within which it normally resides thereby pushing the stud away from the second permanent magnet 87. The stud ejecting position is predetermined so that when the stud is ejected from the face of the carrying block and out of the influence of the magnetic field of the magnet 87, the first permanent magnet 61 will attract the stud drawing the same into engagement therewith. Retraction of the air piston and cylinder arrangement 81 causes the carrying block to move back to the stud receiving position shown in FIGURE 8 and the piston 104 is prevented from leaving the cylindrical opening within which it resides by means of the plate 107.

The ferrule feeder means or mechanism 28 is best shown in detail in FIGURES 10 and 11 and as heretofore mentioned, is for the purpose of positioning ferrules onto the plates 34 at the welding station 45 and these ferrules as is conventional in the art, receive the end portion of the studs which are to be welded in position to the plates. This part of the device includes a ferrule magazine 109 having a generally U-shape in cross section which might also be referred to as a rectangular shape. The magazine is preferably of a width to accommodate the diameter of the ferrule utilized in the particular welding operation and these ferrules have all been indicated by the reference numeral 110. The magazine 109 is mounted in a generally inclined position and has an exit end portion 112 from which the ferrules emerge. The magazine is also provided with a hinged cover 114 which in the operation of the device is normally kept closed. The action of gravity aids in causing the lowermost ferrule to travel from the exit end portion of the magazine, however, a conduit 115 is connected to the exhaust side of a given air valve of the control means which will be described hereinafter and as a result at a predetermined time in the cycle of the welding operation, air under pressure is caused to engage the uppermost ferrule exerting a force tending to push the lowermost ferrule from the exit end portion of the magazine. A fourth air piston and cylinder mechanism 117 (FIGURE 1) is provided and the piston rod of such mechanism is connected to what has been referred to as a ferrule feed plate 119. As noted in FIGURE 10, an abutment 121 is provided so as to limit the position of the lowermost ferrule when it exits the ferrule magazine. The ferrule feed plate 119 has a curved surface to interfit with the shape of the ferrule and this plate is located in the position shown in FIGURE 10 in its retracted position whereat it is positioned to engage a ferrule as it moves forward to its extended position. A ferrule stop member 123 is located at the welding station 45 in a fixed position and also has a surface to interfit the shape of the ferrule so when the ferrule is transported to the welding station by the feed plate 119 it is positioned in a precise position so when the stud is lowered the lower end portion thereof will fit within the diameter of the ferrule.

Control means are provided for actuating the four air piston and cylinder mechanism 37, 55, 81 and 117. FIGURE 12 is a schematic drawing showing the control means most of which is located within the box 125 seen in FIGURE 1. The control means comprises four double acting solenoid actuated air valves identified by the reference numerals 127, 128, 129 and 130, each receiving its air from a common supply line 132. The timing sequence for actuation of the valves 127 through 130 is accomplished by a control mechanism 134 which includes an air cylinder 136 within which a piston 137 is adapted to travel as well as a hydraulic cylinder 138 within which a piston 139 is adapted to travel. The two pistons 137 and 139 are connected by means of a rod 140 and as a result movement of piston 137 is reflected in the movement of the other piston 139. The rod 140 is adapted to carry a switch actuator which has switch engaging portions 141, 142 and 143. Also forming a part of the control mechanism are nine microswitches identified by the reference numerals 145 through 153. Electrical leads (not numbered) extend from each of the microswitches 145 to 153 to a corresponding end of a valve 127 through 130 with the exception of microswitch 150 which controls the actuation of the welding control mechanism 154 which control mechanism 154 serves to control the nature and timing of the welding operation in a manner well known to those skilled in the art. The cylinder and piston 136 and 137 is air actuated and the cylinder 138 and piston 139 serves as a control mechanism to regulate the speed at which the piston 137 traverses the cylinder 136 when air is introduced thereinto. In this sense, hydraulic fluid with cylinder 138 is caused to flow back and forth from one end of the cylinder to the other through conduit 155 which can be restricted to the desired degree by valving arranged therein. In this manner the speed of 137 is controlled.

The control mechanism 134 will be briefly described so as to enable one skilled in the art to appreciate the sequence of operation of the apparatus disclosed in FIGURES 1 through 11. To initiate the operating cycle the solenoid in the left side of air valve 127 is energized moving the valve 127 to the proper position so as to cause air to flow from line 132 through valve 127 and through conduit 157 and it will be noted that conduit 157 is split and one side of the line leads to the air cylinder and piston mechanism 37 causing the plate feeder means to be actuated moving a plate to the welding station 45 and the other side of the line leads to the left end of cylinder 136 causing the control mechanism 134 to be actuated. Movement of piston 137 and rod 140 causes the switches 146 through 153 to be engaged in sequence causing electrical impulses to be transmitted to the solenoids of the valves 127 through 130 with resultant shifting of the valves and as mentioned before, microswitch 150 actuates the welding control mechanism 154.

After the plate feeder means 22 has been actuated as hereinabove described, microswitch 146 is engaged causing actuation of air valve 129 in a desired direction with resultant feeding of air through conduit 159 to the air piston and cylinder mechanism 81 which causes the stud feeder means 26 to move from the stud receiving position to the stud ejecting position. As hereinbefore described, when the stud feeder means arrives at the stud ejecting position, the stud carried thereby is ejected and attracted to the chuck of the welding head by means of the magnet 61. At about the same time switch 146 is engaged, switch 147 is engaged causing valve 130 to be actuated with subsequent feeding of pressurized air through conduit 160 to the air piston and cylinder mechanism 117 and subsequent actuation of the ferrule feeder means 28 which causes a ferrule to be transported from the exit end portion 112 of the ferrule magazine to the welding station 45 in position on top of a plate 34 also located at the welding station. The next switch engaged is switch 148 which causes actuation of air valve 129 to its opposite position with resultant exhausting of air from the left side of the piston and cylinder arrangement 81 and introduction of air through conduit 162 to the right end of the air piston and cylinder mechanism 81 with resultant movement of the stud feeder means from the stud ejecting position back to the stud receiving position. Switch 149 is next engaged energizing valve 128 causing air to be transmitted through conduit 164 to the upper end of the air piston and cylinder mechanism 55 and with resultant downward movement of the welding head means 24. Switch 150 is then engaged thereby actuating the welding control 154 which initiates and controls the welding cycle. This welding cycle has been briefly discussed hereinabove and is a cycle which is conventional and well known to those skilled in the art. Switch 151 is next engaged causing actuation of valve 130 which exhausts air through conduit 160 from the left end of the air piston and cylinder mechanism 117 and introduces air into the right end of the same through conduit 166 causing the ferrule feeder means 28 to be returned to the position shown in FIGURE 10. Switch 152 is the next to be engaged and causes actuation of air valve 128 which exhausts air from the top of air piston and cylinder mechanism 55 and introduces air under pressure through conduit 168 which causes raising or lifting of the welding head means 24. The jaw 58 is caused to release the stud it is holding since all that need be overcome is the force of spring 73. The exhaust from the welding head means 24 through conduit 164 is properly conducted to conduit 115 which has been hereinabove described (FIGURE 10) and which has not been shown in FIGURE 12, which aids in moving the ferrule 110 out of the exit end portion 112 of the ferrule magazine. The next switch engaged is switch 153 which serves to actuate air valve 127 which in turn exhausts conduit 157 and causes air under pressure to be introduced through conduit 170 which is split with one end going to the air piston and cylinder mechanism 37 causing a return of the plate feeder means 22 to the position shown in FIGURES 2 and 3 and also causes air under pressure to be introduced into the right end of cylinder 136 causing the piston 137 of the control mechanism 134 to again move to the left to the position shown in FIGURE 12. Upon return of the piston 137 to the left, the microswitch 145 is engaged by the switch engaging portion 142 again actuating air valve 127 so as to exhaust air through conduit 170 and reintroduce air under pressure through conduit 157 to move the plate feeder means 22 with a plate again to the welding station 45 and also introduces air into the left end of cylinder 136 which starts the control mechanism 134 on another cycle. The control mechanism is such that in movement of the switch engaging portions 141, 142 and 143 from the extreme right position in which they are shown in FIGURE 12 by the dot-dash lines 172 back to the full line position shown in FIGURE 12, they do not reengage the switches 152 through 146. Electrical connection for the flow of weld current is made to the chuck by conductor 175, to clamping members 44 by conductor 176, and to feeder plate 40 by conductor 177.

As a result of the particular construction and development of the welding apparatus which has been hereinabove disclosed, a very high production rate of welding studs to plates or other desired objects can be accomplished and essentially all that an operator of the apparatus need do is keep ferrules supplied to the ferrule magazine 109, studs supplied to the stud magazine 78, and plates supplied to the plate magazine 33. After a welding operation has been completed, the welded stud and plate passes through the opening 49 and down the chute 50 into a suitable storage or receiving means. The welds which result are very consistent in their nature which results in a very large measure from the taking of the human element out of the welding procedure. The means for transporting a weld stud from the stud magazine to the chuck of the welding head greatly facilitates this automated procedure and the use of the magnet in the chuck of the welding head insures consistent positioning of the stud in the chuck during each welding operation. Because of the ability to conveniently alter the size of the stud magazine, ferrule magazine, and plate magazine, to accommodate different sizes and shapes, the machine has a wide range of usage and is particularly efficiently used on high production runs. The magnet 61 constitutes a means for initially holding a stud until the jaws 57 and 58 clamp the same and it will of course be appreciated by those skilled in the art that the means 22, 24, 26 and 28 are capable of operating either separately or in combination with part or all of the remaining means.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for automatically feeding a plate from a magazine to a welding station and then positioning a ferrule on the plate and thereafter delivering a stud to the welding station with one end surrounded by the ferrule which end is welded to the plate, including in combination; a generally horizontally disposed support member, a generally vertically disposed plate magazine carried by said support member, a plate feeder mechanism comprising a first air piston and cylinder mechanism connected to a movable feeder plate, wall means on said movable feeder plate for receiving a plate from said magazine, a fixed clamping member positioned at a welding station, wall means on said clamping member for receiving a portion of a plate when moved thereto by actuation of said first air piston and cylinder arrangement in a first direction and the plate is held in a fixed position, a welding head positioned vertically above said welding station and comprising a second air piston and cylinder mechanism for vertically moving the same between an upper loading position and a lower welding position, a stud chuck carried by said welding head and including a fixed jaw and a pivotally mounted jaw, a first permanent magnet located between said jaws, cam means cooperating with said jaws for causing the same to be moved to open position in said upper loading position, spring means cooperating with said jaws and causing said jaws to be held closed in said lower welding position, a generally vertically disposed stud magazine carried by said support member, a stud feeder mechanism comprising a third air piston and cylinder mechanism for moving the same between a stud receiving and stud ejecting station, said stud feeder mechanism including a stud carrying block having a front face generally contoured to receive the curved side of a stud, a second permanent magnet carried by said carrying block at said front face, said carrying block having a top edge surface closing the end of said stud magazine in all positions of said block except said stud receiving station whereat a stud drops by gravity to a position adjacent said front face and is attracted by said second permanent magnet, said stud carrying block having a bottom edge surface, a ledge member secured to said bottom edge surface and extending beyond said front face to provide a vertical stop for studs carried by said front face, first and second spring members located on either side of a stud at said stud receiving station and adapted to engage a stud upon movement of said stud carrying block toward said stud ejecting station to assure that the stud is firmly engaged with said front face, a stop carried by said carrying block for preventing further movement of the same when said carrying block arrives at said stud ejecting station, an ejecting pin extending through said carrying block and terminating at one end at said front face, means connecting the other end of said ejecting pin to said third air piston and cylinder mechanism, a spring member positioned between the other end of said ejecting pin and said carrying block and transmitting the force from said third air piston and cylinder mechanism to said carrying block to move said carrying block from said stud receiving position to said stud ejecting position whereat said stop prevents further movement of said carrying block and said third air piston and cylinder mechanism overcomes said spring member and causes said ejecting pin to move beyond said front face and force a stud carried thereon by said second permanent magnet to be ejected therefrom, ejection of a stud at said stud ejecting station causes the stud so ejected to be carried to said stud chuck by said first permanent magnet, a ferrule feeder mechanism for positioning ferrules into position on the plates fed by said plate feeder mechanism and located to receive the end of a stud carried by said stud chuck of said welding head, a ferrule magazine comprising a generally rectangularly shaped chute having a cover and mounted in an inclined position and having an exit end portion, a fourth air piston and cylinder mechanism connected to a ferrule feed plate, said ferrule feed plate being movable between a retracted position and an extended position and in retracted position located to engage a ferrule at said exit end portion of said chute, a ferrule stop member located at said welding station for limiting the movement of and positioning a ferrule moved by said ferrule feed plate, control means for actuating said air piston and cylinder arrangements in timed relationship to each other to bring a plate, a ferrule, and a stud together at said welding station, and welding circuit means for causing electrical current flow between a stud and a plate to weld the two together.

2. Apparatus for automatically feeding a plate from a magazine to a welding station and then positioning a ferrule on the plate and thereafter delivering a stud to the welding station with one end surrounded by the ferrule which end is welded to the plate including in combination; a generally horizontally disposed support member, a generally vertically disposed plate magazine carried by said support member, a plate feeder mechanism comprising a movable feeder plate, wall means on said movable feeder plate for receiving a plate from said magazine, a fixed clamping member positioned at a welding station, wall means on said clamping member for receiving a portion of a plate when moved thereto by movement of said movable feeder plate in a first direction and the plate is held in a fixed position, a welding head positioned vertically above said welding station and comprising means for vertically moving the same between an upper loading position and a lower welding position, a stud chuck carried by said welding head and including a fixed jaw and a pivotally mounted jaw, a first permanent magnet located between said jaws, cam means cooperating with said jaws for causing the same to be moved to open position in said upper loading position, spring means cooperating with said jaws and causing said jaws to be held closed in said lower welding position, a generally vertically disposed stud magazine carried by said support member, a stud feeder mechanism comprising means for moving the same between a stud receiving and stud ejecting station, said stud feeder mechanism including a stud carrying block having a front face generally contoured to receive the curved side of a stud, a second permanent magnet carried by said carrying block at said front face, said stud carrying block having a top edge surface closing the end of said stud magazine in all positions of said block except said stud receiving station whereat a stud drops by gravity to a position adjacent said front face and is attracted by said second permanent magnet, said stud carrying block having a bottom edge surface, a ledge member secured to said bottom edge surface and extending beyond said front face to provide a vertical stop for studs carried by said front face, first and second spring members located on either side of a stud at said stud receiving station and adapted to engage a stud upon movement of said stud carrying block toward said stud ejecting station to assure that the stud is firmly engaged with said front face, a stop carried by said carrying block for preventing further movement of the same when said carrying block arrives at said stud ejecting station, an ejecting pin extending through said carrying block and terminating at one end at said front face, means connecting the other end of said ejecting pin to said means for moving said stud feeder mechanism, a spring member positioned between the other end of said ejecting pin and said carrying block and transmitting the force from said means for moving said stud feeder to said carrying block to move said carrying block from said stud receiving position to said stud ejecting position whereat said stop prevents further movement of said carrying block and said means for moving said stud feeder overcomes said spring member and causes said ejecting pin to move beyond said front face and force a stud carried thereon by said second permanent magnet to be ejected therefrom, ejection of a stud at said stud ejecting station causes the stud so ejected to be carried to said stud chuck by said first permanent magnet, a ferrule feeding mechanism for positioning ferrules into position on the plates fed by said plate feeder mechanism and located to receive the end of a stud carried by said stud chuck of said welding head, a ferrule magazine mounted in an inclined position and having an exit end portion, a ferrule feed plate, said ferrule feed plate being movable between a retracted position and an extended position and in retracted position located to engage a ferrule at said exit end portion of said ferrule magazine, a ferrule stop member located at said welding station for limiting the movement of and positioning a ferrule moved by said ferrule feed plate, control means for moving said aforementioned elements in timed relationship to each other to bring a plate, a ferrule, and a stud together at said welding station, and welding circuit means for causing electrical current flow between a stud and a plate to weld the two together.

3. Welding apparatus including in combination a support member, a plate magazine carried by support member, a plate feeder mechanism comprising a movable feeder plate, wall means on said movable feeder plate for receiving a plate from said magazine, a fixed member positioned at a welding station, wall means on said fixed member for receiving a portion of a plate when moved thereto, a welding head positioned above said welding station and being movable between an upper loading position and a lower welding position, a stud chuck carried by said welding head and including a first permanent magnet, a stud magazine carried by said support member, a stud feeder mechanism comprising a stud carrying block having a surface, a second permanent magnet carried by said carrying block at said surface, said stud carrying block being movable between a stud receiving and stud ejecting position and at the former position said second permanent magnet receives a stud from said stud magazine, ejecting means operable at said stud ejecting position for pushing a stud from said surface of said carrying block away from the influence of said second permanent magnet and the stud is carried to said stud chuck by the influence of said first permanent magnet, a ferrule feeder mechanism for positioning ferrules into position on the plates fed by said plate feeder mechanism in position to receive the end of a stud carried by said stud chuck of said welding head, a ferrule magazine having an exit end portion, a ferrule feed plate, said ferrule feed plate being movable between a retracted position and an extended position and in retracted position located to engage a ferrule at said exit end portion of said ferrule magazine and in extended position locating a ferrule at said welding station, control means for moving said plate feeder mechanism, stud feeder mechanism, ferrule feeder mechanism and welding head in timed relation to each other, and welding circuit means for causing electrical current flow between a stud and a plate to weld the two together at said welding station.

4. Welding apparatus including in combination a plate magazine, first means for receiving a plate from said plate magazine and carrying the same in a generally straight line direction to a welding station and holding the same in a welding position, a ferrule magazine, second means for receiving a ferrule from said ferrule magazine and carrying the same in a generally straight line direction to said welding station on a plate and holding the same in this position, welding head means located vertically above said welding station at a loading station and including clamping jaws movable between open and closed positions and a first permanent magnet, third means for moving said welding head means between said loading station and said welding station, means for opening said clamping jaws at said loading station and closing said clamping jaws at said welding station, a stud magazine, fourth means for receiving a stud from said stud magazine and including a second permanent magnet for holding the stud and carrying the stud to a position close to said first permanent magnet at said loading station of said welding head means, ejecting means for pushing a stud away from said second permanent magnet when same is located close to said first permanent magnet and said first permanent magnet attracts and holds the stud, control means for actuating said first, second, third and fourth means in timed relation to each other to bring a plate, ferrule, and stud to said welding station, and electrical welding circuit means for causing current flow between the plate and stud to weld the two together.

5. Welding apparatus including in combination a plate magazine, first means for receiving a plate from said plate magazine and carrying the same to a welding station and holding the same in a welding position, a ferrule magazine, second means for receiving a ferrule from said ferrule magazine and carrying the same to said welding station on a plate and holding the same in this position, welding head means located above said welding station at a loading station and including clamping jaws movable between open and closed positions and a first permanent magnet, third means for moving said welding head means between said loading station and said welding station, means for opening said clamping jaws at said loading station and closing said clamping jaws at said welding station, a stud magazine, fourth means for receiving a stud from said stud magazine and including a second permanent magnet for holding the stud and carrying the stud to a position close to said first permanent magnet at said loading station of said welding head means, ejecting means for pushing a stud away from said second permanent magnet when same is located close to said first permanent magnet and said first permanent magnet attracts and holds the stud, control means for actuating said first, second, third and fourth means in timed relation to each other to bring a plate, ferrule, and stud to said welding station, and electrical welding circuit means for causing current flow between the plate and stud to weld the two together.

6. Welding apparatus including in combination a plate magazine, first means for receiving a plate from said plate magazine and carrying the same to a welding station and holding the same in a welding position, a ferrule magazine, second means for receiving a ferrule from said ferrule magazine and carrying the same to said welding station on a plate and holding the same in this position, welding head means located vertically above said welding station at a loading station and including clamping jaws moveable between open and closed positions and a first permanent magnet, third means for moving said welding head means between said loading station and said welding station, means for opening said clamping jaws at said loading station and closing said clamping jaws at said welding station, a stud magazine, fourth means for receiving a stud from said stud magazine and carrying the stud to a position close to said first permanent magnet at said loading station of said welding head means whereat said first permanent magnet attracts and holds the stud, control means for actuating said first, second, third and fourth means in timed relation to each other to bring a plate, ferrule, and stud to said welding station, and electrical welding circuit means for causing current flow between the plate and stud to weld the two together.

7. Welding apparatus including in combination a plate magazine, first means for receiving a plate from said plate magazine and carrying the same to a welding station and holding the same in a welding position, a ferrule magazine, second means for receiving a ferrule from said ferrule magazine and carrying the same to said welding station on a plate and holding the same in this position, welding head means located vertically above said welding station at a loading station and including clamping jaws movable between open and closed positions and a first permanent magnet, third means for moving said welding head means between said loading station and said welding station, means for closing said clamping jaws at said welding station, a stud magazine, fourth means for receiving a stud from said stud magazine and carrying the stud to a position close to said first permanent magnet at said loading station of said welding head means whereat said first permanent magnet attracts and holds the stud, and means for welding a stud to a plate at said welding station.

8. Welding apparatus including in combination a plate magazine, first means for receiving a plate from said plate magazine and carrying the same to a welding station and holding the same in a welding position, a ferrule magazine, second means for receiving a ferrule from said ferrule magazine and carrying the same to said welding station on a plate and holding the same in this position, welding head means located above said welding station at a loading station and including clamping jaws movable between open and closed positions, third means for moving said welding head means between said loading station and said welding station, means for opening said clamping jaws at said leading station and closing said clamping jaws at said welding station, a stud magazine, fourth means for receiving a stud from said stud magazine and carrying the stud to said chuck at said loading station in a direction generally transverse to the direction of movement of said welding head, means for initially holding a stud in said chuck until said welding head has moved to said welding station whereat said clamping jaws are closed firmly holding the stud, control means for actuating said first, second, third and fourth means in timed relation to each other to bring a plate, ferrule, and stud to said welding station, and electrical welding circuit means for causing current flow between the plate and stud to weld the two together.

9. Welding apparatus including in combination a plate magazine, first means for receiving a plate from said plate magazine and carrying the same to a welding station and holding the same in a welding position, a ferrule magazine, second means for receiving a ferrule from said ferrule magazine and carrying the same to said welding station on a plate and holding the same in this position, welding head means located above said welding station at a loading station and including clamping jaws movable between open and closed positions, third means for moving said welding head means between said loading station and said welding station, means for opening said clamping jaws at said loading station and closing said clamping jaws at said welding station, a stud magazine, fourth means for receiving a stud from said stud magazine and carrying the stud to said chuck at said loading station in a direction generally transverse to the direction of movement of said welding head, means for initially holding a stud in said chuck until said welding head has moved to said welding station whereat said clamping jaws are closed firmly holding the stud, and means for welding a stud to a plate at said welding station.

References Cited

UNITED STATES PATENTS

| | | | |
|---|---|---|---|
| 2,685,018 | 7/1954 | Mynar | 219—79 |
| 3,073,947 | 1/1963 | Mortensen et al. | 219—103 |

OTHER REFERENCES

IBM Technical Disclosure Bulletin, Welding Machine-Stud Feed, vol. 1, No. 2, August 1958.

RICHARD M. WOOD, *Primary Examiner.*

C. M. CHADD, *Assistant Examiner.*